United States Patent [19]

Delignieres

[11] 4,222,630
[45] Sep. 16, 1980

[54] DIGITALLY CONTROLLED FIBER OPTIC RECORDING DEVICE

[75] Inventor: Robert Delignieres, Mareil-Maily, France

[73] Assignee: Institut Francias du Petrole, Rueil-Malmaison, France

[21] Appl. No.: 930,480

[22] Filed: Aug. 2, 1978

[30] Foreign Application Priority Data

Aug. 3, 1977 [FR] France ................... 77 24152

[51] Int. Cl.$^2$ .................... G02B 5/16; G01D 9/00
[52] U.S. Cl. ................... 350/96.24; 250/227; 346/33 A; 350/6.2
[58] Field of Search ............ 250/227; 350/6.1, 6.2, 350/96.15, 96.24, 96.25; 346/33 A, 33 EC, 33 C, 107 A

[56] References Cited
U.S. PATENT DOCUMENTS

| | | | |
|---|---|---|---|
| 3,240,106 | 3/1966 | Hicks | 350/6.2 |
| 3,282,666 | 11/1966 | Gallagher et al. | 350/96.24 X |
| 3,325,594 | 6/1967 | Goldhammer et al. | 350/96.24 X |
| 3,602,640 | 8/1971 | Maillet et al. | 350/96.24 X |
| 3,770,909 | 11/1973 | Rose et al. | 350/96.18 X |
| 3,770,910 | 11/1973 | Rose et al. | 350/96.18 X |
| 3,995,207 | 11/1976 | Way | 346/33 A X |

Primary Examiner—John K. Corbin
Assistant Examiner—John D. Lee
Attorney, Agent, or Firm—Millen & White

[57] ABSTRACT

A device for recording data on a photosensitive recording support comprises a light beam transmitter, means for modulating the intensity of said light beam in relation with the data to be recorded, a fiber optic transducer with one circular end and one straight end, in operative relation with the modulating means at the circular end and with the recording support at the straight end and means for incrementally displacing said support relative to the transducer.

9 Claims, 2 Drawing Figures

DIGITALLY CONTROLLED FIBER OPTIC RECORDING DEVICE

BACKGROUND OF THE INVENTION

This invention relates to a device for recording data on a recording support means and, more particularly, on a support means sensitive to light.

The recording of data on a surface sensitive to light, by an optical process, in orthogonal coordinates, involves a displacement or sweeping with a light or electron beam, forming a transducing means, along a direction, combined with a relative displacement of this light beam with respect to the sensitive support along a direction orthogonal to the sweeping direction. The intensity of the light beam for each of its successive positions is so modulated as to vary at each point the recording density in accordance with a predetermined function.

The large variety of recorders may be classified in different families according to the nature of the recording support, the recording physical principle, the selected mode for displacing the recording support relative to the transducer member and a "page sitting" function used to register information onto the support.

The recording devices are generally very specialized and are scarcely convenient for other uses than those they are designed for. This disadvantage results to a large extent from the fact that the "page sitting" function is fixed.

SUMMARY OF THE INVENTION

The device of the present invention has a structure adapted to a number of different applications, such as, for example, the display of sonar or belino pictures, the optical recording of seismic data according to the variable density, area or elongation processes and, more generally, to multichannel recording of data in an industrial process control system or to the sequential recording of data in cartesian coordinates.

The device comprises a recording support sensitive to light, an optical member adapted to generate a variable light beam, of fixed direction, to act upon the recording support, means for modulating said light beam, a fiber optic transducing system and means for the sequential transmission of the light beam to the optic fibers of the transducing system.

The device is remarkable in that it comprises incremental displacement means of the recording support relative to the transducing system and digital monitoring means for modulating the illumination time of each optical fiber by the light beam issued from the modulating means and for controlling the transmission and displacement means.

The use of digital monitoring means makes it possible to utilize preliminary processing for the "page sitting" of the information to be recorded and to perform scale adjustments and prefiltrations before its transfer to a memorization member and then onto the recording support.

BRIEF DESCRIPTION OF THE DRAWINGS

Other characteristics and advantages will be made apparent from the following description of a non-limitative embodiment of the recording device according to the invention and with reference to the accompanying drawings wherein.

DETAILED DISCUSSION

Figure 1:
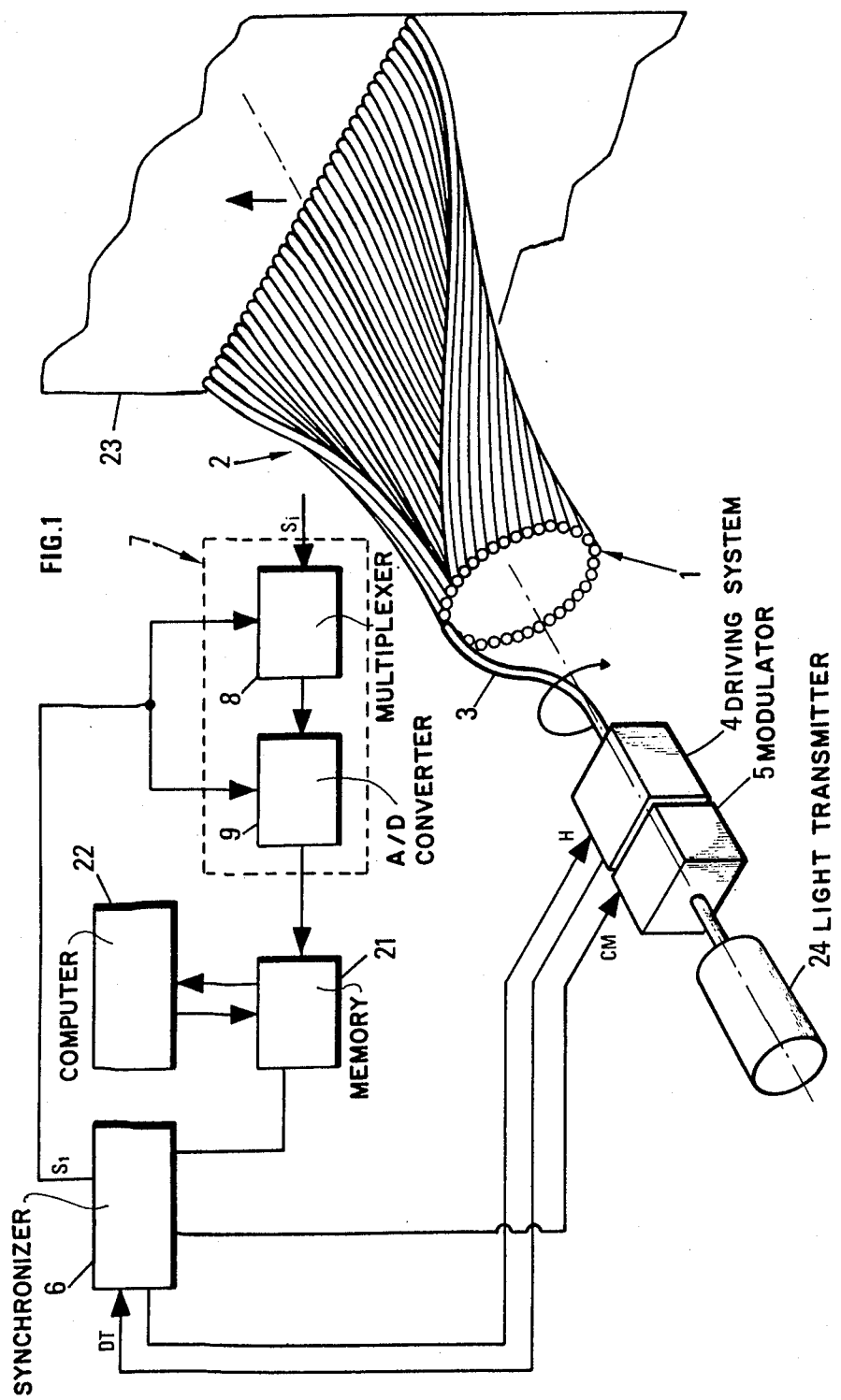
FIG. 1 shows a synoptical diagram of the fiber optic transducing system combined with an optic member and means for modulating the intensity of the beam transmitted therefrom.

The recording system shown in FIG. 1 comprises an optical fiber transducer 1. The latter consists of a sheet 2 or several sheets of optical fibers adjacent to one another. At one end, the fiber sheet is spread out so that the end portion of the fibers are in line. At the other end, the sheet is so incurved that the terminal parts of the fibers are arranged along the circumference of a circle. In this arrangement, the two end fibers defining the borders of the fiber sheet become adjacent at their other ends. In front of the end of the sheet where the fibers form a circle, is placed an optic scanning fiber 3 comprising an end part placed along the axis of the circumference and another end part offset by a distance equal to the radius of the circumference. The whole scanning fiber is driven in rotation by motor means 4 connected to its centered end. The latter is then rotated about itself.

The other end of the scanning fiber 3 is so arranged as to face during its rotation, successively the ends of all the optical fibers of the fiber optic transducer which are arranged along a circle.

The motor means may consist of a step-by-step motor when the required scanning rate is relatively low or otherwise of a synchronous motor.

It would be within the scope of the invention to substitute for the optic fiber any other known system permitting an offset of the fixed light beam so that it describes a circumference of the same diameter as that of the circular end of the fiber optic transducer. There can be used, for example, a frame driven in rotation and supporting deflecting mirrors arranged in a parallel fashion facing one another and inclined at 45° with respect to the axis of the light beam of fixed direction.

A recording support 23, consisting for example of a dry thermo-developable photo-sensitive support, is placed in front of the spread out end of the optic fiber transducer 1 and is propelled, through driving means, not shown, to successive incremental displacements P or to a continuous displacement, along a direction perpendicular to the fiber line.

Along the axis of the centered end of the scanning fiber is placed a light transmitter 24 consisting, for example, of a laser. The light beam transmitted by the laser passes through a light modulator 5 which regulates, for example, the illumination time of the scanning fiber 3. The light beam is lead from the revolving scanning fiber 3 successively to the ends of the fibers arranged along the circumference. As a result, each line of the recording support 23 is swept by a light beam of modulated intensity which immediately comes back to its starting point due to the structure of the optic transducer. The sweeping of each line is performed with a resolution depending on the linear density of the fibers.

The modulator 5 consists, for example, of a known system for intermittently deviating the beam of the light transmitter 24. The light modulator 5 is controlled through a synchronization member 6. The latter is connected to motor means hereinafter called driving system 4. It provides thereto a signal H for controlling its operation and receives therefrom recurrent pulses DT, transmitted at each revolution of the scanning fiber. The light modulator 5 is connected to a chain of data collection, comprising an interface system 7, specific for each application and which, in the described embodiment, comprises device 8 for multiplexing analog information $S_i$, connected to an analog to digital converter 9 which transforms the multiplexed signals to digital samples. The converter 9 introduces the digitally expressed signals in a buffer memory 21 which feeds the light modulator 5.

The buffer memory 21 is connected to a computer 22 of a known type and adapted to perform, on the recorded information, various operations of correction and page sitting, to adapt it to the desired recording mode. These various operations may be performed either in real time or in deferred time. The treated information is then reintroduced into the buffer memory 21.

The synchronous operation of the interface system 7, the buffer memory 21 and the light modulator, is performed by means of synchronization signals produced by the synchronization member 6.

Figure 2:
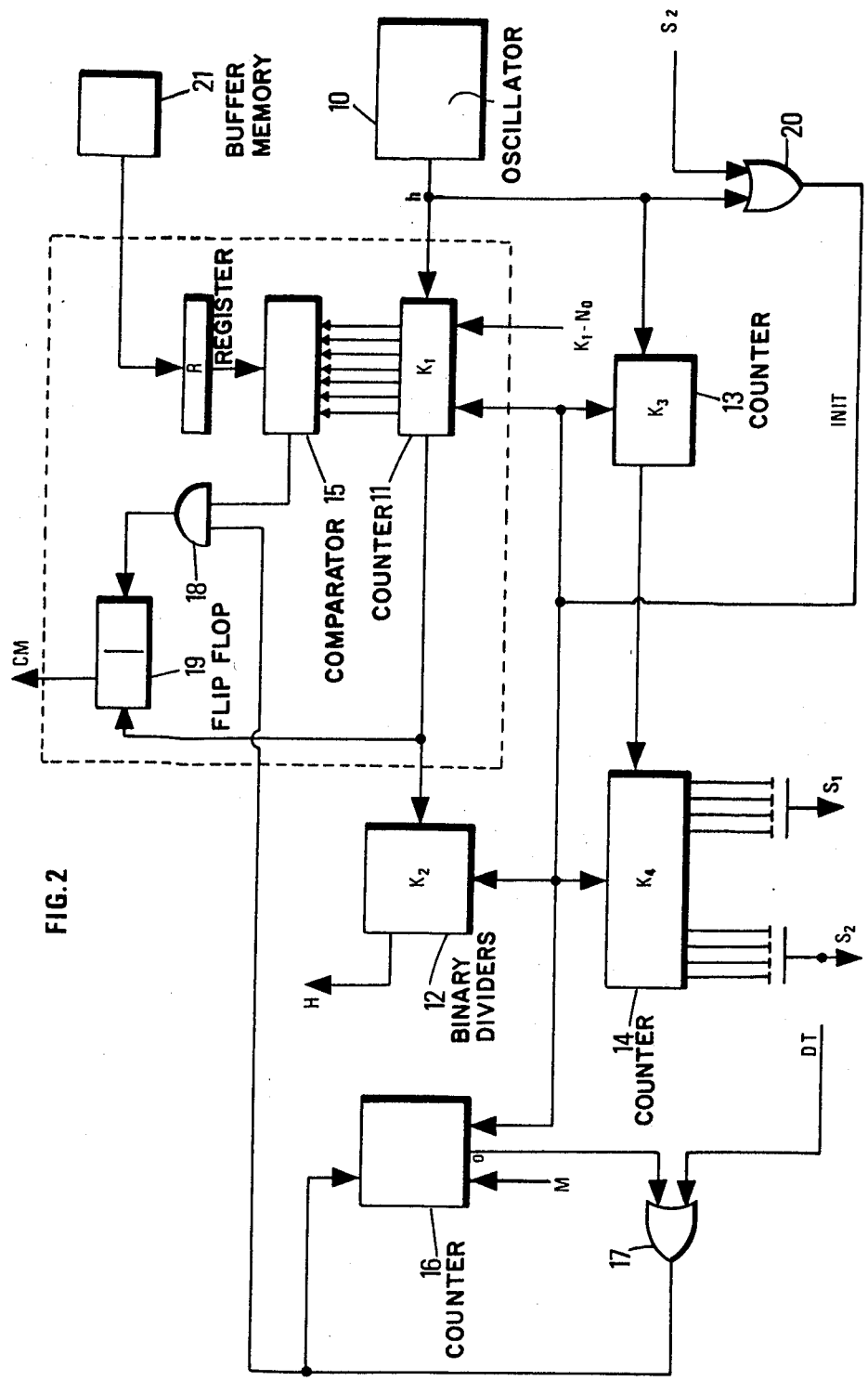
FIG. 2 diagrammatically shows an example of embodiment of a system for synchronizing the operation of the recording device.

The synchronization member shown in FIG. 2 comprises an oscillator 10, producing clock pulses h, defining a time base.

The oscillator 10 is connected to two chains of counting elements. The first one comprises a first contour 11, producing successive pulses at a recurrence period $K_1$, connected in series with a chain 12 of binary dividers of the frequency of the pulses produced by contour $K_1$.

At the output of rank $K_2$, the divider chain 12 produces a signal H controlling the operation of the driving system 4 (FIG. 1). The second chain of counting elements comprises a first counter 13, dividing the frequency of the clock pulses by a factor $K_3$ and connected in series with a second chain of binary dividers 14 of the frequency of the pulses produced by counter 13. At the output of counter 14 are available control signals $S_1$ of the interface system 7 (FIG. 1), for the making up of signal samples and their introduction into the buffer memory 21 and also very low frequency pulses $S_2$, used for monitoring a stimulation system, not shown, transmitting signals whose echoes are then registered. In the case where the recording device is used for echography in general and more particularly for seismic prospecting, the stimulation member consists of an acoustic or seismic wave transmitter.

The parallel outputs of counter 11 are connected to the first inputs of a comparator 15 whose second inputs are connected to parallel outputs of a register R, where are introduced the "words" taken out successively from the buffer memory 21.

A counter 16, operating as a down-counting means, receives down-counting pulses through an AND gate 17. An input of the AND gate 17 is connected to the output of counter 16 where are available the carry pulses. The other input of the AND gate 17 receives signal DT, transmitted at each revolution by the driving system of the scanning fiber.

The output of the AND gate 17 is also connected to one of the inputs of an OR gate 18 whose other input is connected to the output of comparator 15. The output of the OR gate 18 is connected to a first input of the bistable flip-flop 19 whose other input is connected to the output of counter 11. On one of the outputs of flip-flop 19 is available the control signal CM of the light modulator 5 (FIG. 1). The signal $S_2$, produced by counter 14, is received on an input of an AND gate 20 whose other input is connected to the output of the oscillator producing the clock pulses h. The output of the AND gate 20 is connected to counters 11, 12, 13, 14 and 16. The signal INIT, produced by the AND gate 20, imparts to all the elements to which it is applied, a predetermined state at each revolution of the driving system 4.

Number $K_2$, defining the division factor of counter 12, is preferably chosen equal to the number of fibers of the optic transducer 1. Each cycle, of revolution time $\theta$, of the driving system 4 (FIG. 1) defined by the time interval between two DT signals, is divided into a number $K_2$ of periods T. During each period, a "word" of the memory is introduced into register R.

Each period T, corresponding to the time interval during which the end of the scanning fiber registers with the end of each fiber of the optic transducer, is subdivided by counter 11 to $K_1$ equal time intervals of duration t.

The illumination time of each fiber is equal to the duration of the square wave CM generated by the flip-flop 19, which is successively actuated by each pulse produced by the dividing counter 11 and by the comparator 15 when the latter detects the equality between the content N of said counter and that of register R.

The illumination time Nt of each fiber is selected substantially shorter than period T. In order to center as well as possible the axis of the scanning fiber with respect to the axis of each scanned fiber and to reduce the picture diffusion, i.e. the transmission by the scanning fiber to several fibers of a signal specifically intended for only one of them, counter 11 is initially set at a number $K_1 - N_0$, $N_0$ being a fixed predetermined number. By this way, the beginning of the illumination period of the fiber occurs at a moment when the light beam is no longer in the vicinity of the edge of the fiber and no parasitic illumination of the adjacent fiber is possible.

When the recurrence period of the signals to be registered (1 second for example) is much longer than the running period of the motor (for example 10 ms), it is possible to record the same information on a certain number M of the recording lines, separated by intervals equal to the advance pitch of the recording support. For this purpose, the selected number M is introduced as a preselection in counter 16 after authorization through the recurrent signal INIT. After down-counting, the passage to zero value of the content of counter 16 inhibits gate 17, whereby the bistable flip-flop 19 is triggered and the modulator of the light beam is discontinued.

What I claim is:

1. A device for recording data on a photosensitive recording support, comprising an optical member adapted to transmit a light beam of variable intensity and fixed direction, means for modulating said light beam, a fiber optic transducing system and means for sequentially transmitting the light beam to the optic fibers of the transducing system at one of their ends, the other ends of said optic fibers being so located that the light transmitted through each fiber impinges on said photosensitive recording support, said device further comprising means for incremental displacement of the recording support relative to the transducing system, and digital monitoring means for modulating the length of time that each optic fiber is illuminated by the light beam issued from said modulation means in proportion to the value of the datum being recorded, and for controlling the transmission means and the displacement means.

2. A device according to claim 1, wherein the sequential transmisstion means comprises a revolving scanning fiber actuated by driving means and the digital monitoring means comprises a switch member and means for controlling said switch member at successive instants depending on the value of the signals recorded in a memorization member.

3. A device according to claim 2, wherein the transmission means comprises driving means adapted to transmit reference signals for the control of the switch member.

4. A device according to claim 3, wherein the means for controlling the switch member are adapted to deliver thereto control signals when the scanning fiber faces each fiber end and during a time shorter than the time of passage of the scanning fiber in front of each fiber of the transducing system.

5. A device according to claim 2, wherein the switch member is connected to a member for comparing the successive values picked up from the memorization member to values contained in a counting member connected to means for generating clock signals defining time bases.

6. A device according to claim 5, wherein the means for generating clock signals comprises two chains of counting elements producing synchronization signals at different frequencies and controlled by reference signals generated by the means for driving the revolving scanning fiber.

7. A device according to claim 6, comprising means for converting analog signals to digital ones, wherein the means for generating clock signals comprises a first chain of dividing elements, producing signals for synchronizing the switch member, and a second chain of dividing elements, producing signals for synchronizing the signal converting means.

8. A device according to claim 7, wherein the signal converting means comprises a multiplexer and an analog to digital converter.

9. A device according to claim 2, wherein the memorization member is connected to digital processing means.

* * * * *